Patented Apr. 25, 1939

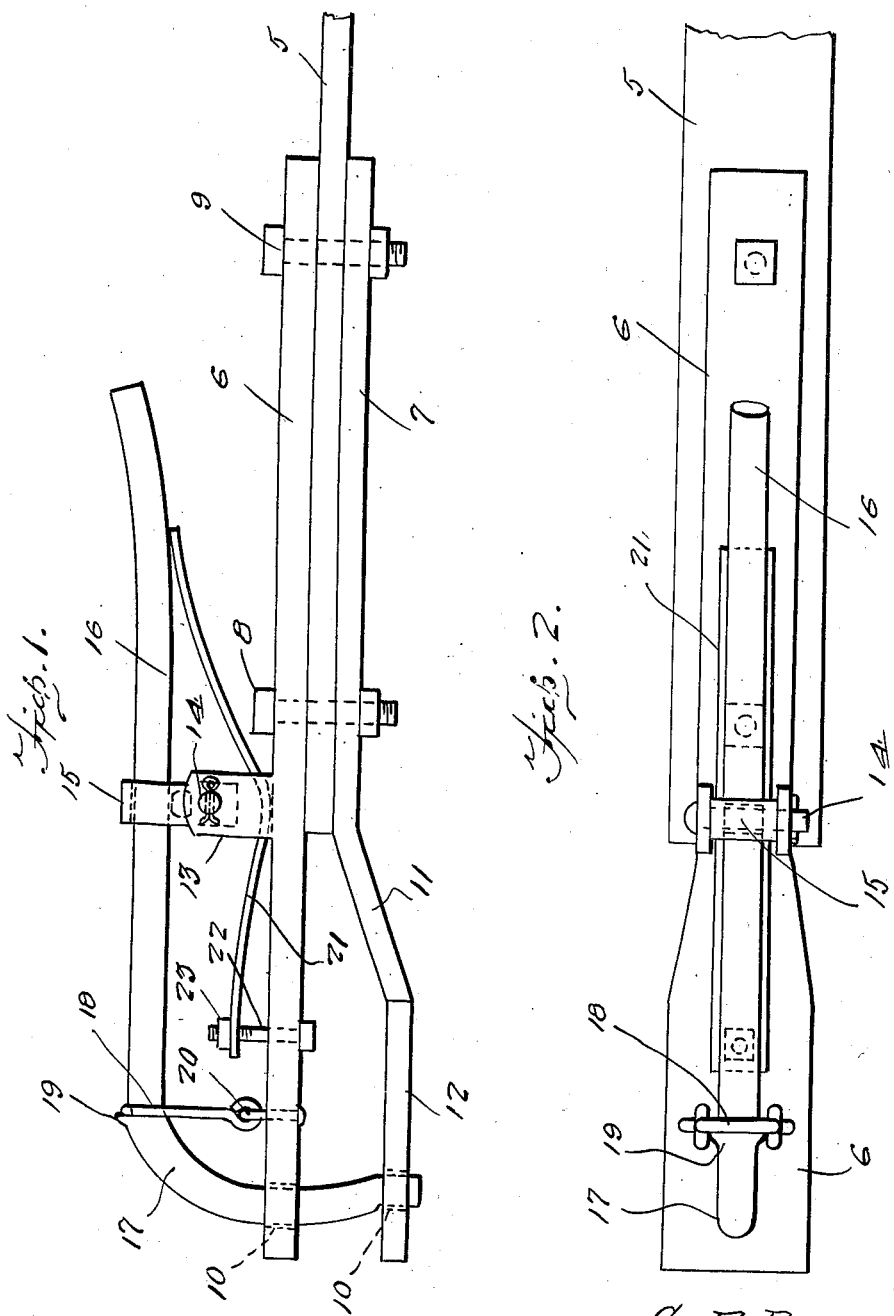

2,155,782

UNITED STATES PATENT OFFICE 2,155,782

TRAILER COUPLER

Carl F. Bracht, Twin Brooks, S. Dak.

Application April 27, 1938, Serial No. 204,681

2 Claims. (Cl. 280—33.15)

This invention appertains to new and useful improvements in coupling means for trailers.

The principal object of the present invention is to provide a coupling or hitch for trailers which will be positive acting and substantially foolproof in that there is practically no likelihood of the same opening accidentally.

Another important object of the invention is to provide a device of simple construction and not apt to readily develop defects.

These and various other important objects and advantages of the invention will become apparent to the reader of the following specification.

In the drawing:

Figure 1 represents a side elevational view of the coupler.

Figure 2 is a top plan view.

Referring to the drawing wherein like numerals designate like parts, it can be seen that numeral 5 represents the trailer bar to which the upper and lower bars 6—7 are secured by bolts 8—9. Overlying ends of these bars 6—7 which pass beyond the free end of the trailer bar 5 are formed with openings 10 and as can be seen in Figure 1, this end of the bar 7 is diverged downwardly as at 11 and then extended as at 12 in parallel relation with respect to the overlying bar 6.

A U-shaped bracket 13 is secured to the top bar 6 and has the pin 14 extending therethrough. A sleeve 15 has a depending portion formed with an opening through which the pin 14 extends and this sleeve receives the elongated arm 16 which has the downwardly curved hook-like end portions 17 for disposition through the openings 10 of the bars 6—7. A yoke 18 is engageable over the handle 16 to abut the lip 19 and this yoke is secured by a bail 20 to the top bar 6.

Numeral 21 represents an elongated strip spring which is bent upwardly at one end to engage the handle 16 and its other end is apertured to receive the bolt 22 which extends upwardly through the bar 6 and is equipped with the nut 23.

It can now be seen, that due to the presence of the yoke 18, the hook 17 cannot be lifted, but by lifting upwardly slightly on the free end of the handle 16, the member 18 can be lifted over the lip 19 and the hook 17 freed so that it can be disengaged from the bar 7.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A trailer coupler comprising a draw bar including spaced superimposed plates having openings, a bracket secured on the uppermost plate, a sleeve pivoted on the bracket, a lever extending through the sleeve for pivotal movement on the bracket and slidable endwise of the uppermost plate and including a hook-shaped portion for movement into and out of the openings, a spring mounted on the uppermost plate and bearing against the lever to urge the hook-shaped portion thereof through the openings, a lip formed on the lever, and a yoke pivoted on the uppermost plate and movable over the lever from the hook-shaped portion thereof to engage the lip for securing the hook-shaped portion against movement out of the openings.

2. A trailer coupler comprising a draw bar including spaced superimposed plates having openings, a substantially U-shaped bracket secured on the uppermost plate, a sleeve pivoted on the bracket, a lever extending through the sleeve for sliding movement endwise of the uppermost plate and for pivotal movement on the bracket and including a hook-shaped portion for movement into and out of the openings, a leaf spring bearing on the uppermost plate intermediate its ends and positioned within the substantially U-shaped bracket and having one end bearing against the lever to urge the hook-shaped portion thereof through the openings, an adjustable fastener connecting the other end of the spring onto the uppermost plate, a lip formed on the lever, and a yoke pivoted on the uppermost plate and movable over the lever from the hook-shaped portion thereof to engage the lip for securing the hook-shaped portion against movement out of the openings.

CARL F. BRACHT